United States Patent Office 3,697,350
Patented Oct. 10, 1972

3,697,350
METHOD OF MAKING AN ENAMELED DECORATIVE BOARD
Akira Yamanouchi, Neyagawa-shi, Seisuke Takenaka, Kadoma-shi, and Yukio Mitori, Neyagawa-shi, Japan, assignors to Matsushita Kenko Kabushiki Kaisha, Osaka, Japan
No Drawing. Filed June 10, 1969, Ser. No. 831,988
Claims priority, application Japan, June 25, 1968, 43/44,320
Int. Cl. B29c 19/00
U.S. Cl. 156—245  4 Claims

ABSTRACT OF THE DISCLOSURE

The present invention relates to an enameled decorative board prepared by fixing, with adhesive in between an enameled aluminum sheet on a base material made of veneer boards, fiber boards, asbestos boards or laminate of paper or cloth dipped into a thermosetting resin solution, and by drying the composite board. The decorative board of this invention can be advantageously produced by placing an enameled aluminum sheet prepared by melt-baking frit of a low melting point on the surface of the aluminum onto said base material, and then by placing damper layer provided on the enameled surface and a suppression plate on the damper layer, to be pressed together.

The thus prepared enameled decorative board has excellent resistance against water, heat, light, and corrosion, and the enameled surface is beautiful; therefore, it is especially effective as a decorative board for outdoor use.

---

The present invention relates to a new enameled decorative board having a beautiful enameled surface having no cracks, and the method for producing the same.

Generally speaking, according to the prior art, a the decorative board to be used for the outdoor use of buildings is made of melamine resin, polyester resin, or printed veneer, although the decorative board is not particularly suited for outdoor use, but rather is intended for indoor use because of the properties and the appearance thereof. Thus, according to the prior art, the same kinds of decorative boards have been used for outdoor use as are actually suitable for indoor use.

In other words, the conventional decorative board has the drawback that it cannot satisfactorily stand severe outdoor conditions, such as weather, in view of its resistance against water, light, and corrosion.

The inventors of this invention found that when an enameled aluminum sheet prepared by melt-baking a frit of low melting point on the surface of the aluminum sheet is fixed on a base material with adhesive in between the aluminum sheet and the base material and the thus prepared material is press-shaped to produce a united board having an enameled surface, the thus obtained board is useful as a decorative board which can also be used outdoors.

An enameled board prepared by subjecting an aluminum sheet to an enameling treatment is well known to those skilled in the art, but such enameled board is prepared by directly placing stainless steel or Duralumin board or a board having been subjected to a sputtering treatment on the enameled aluminum sheet. The thus obtained board is press-shaped under a high pressure, such as from 70 to 120 kg./cm.². Therefore, in the press-shaping process, it is difficult for the pressure to be uniformly applied to the enameled surface of the aluminum sheet. Therefore, cracks are easily brought about on the portion of enameled surface where pressure is not provided, or when the particles of frit before the baking process are present in an unmelted or half-melted state on the enameled surface, this portion presents the so-called "nail" form appearance after the press-shaping process. When foams or other intervals are present in the enameled layer, the portion having foams produce the so-called "fish eye" to deteriorate the appearance of the enameled surface.

Therefore, the conventional enameled aluminum sheet cannot be used as the decorative board without encountering substantial difficulties when using the techniques of the prior art.

The inventors of the present invention found that frit of a low melting point is melt-baked on the surface of an aluminum sheet to form the enameled aluminum sheet, and the thus obtained enameled aluminum sheet is placed on a base material through adhesive between the two layers, and a damper layer made of relatively elastic damper material is placed on the enameled surface of the above-obtained board, and a suppression plate is placed thereon, the press-shaping process carried out thereon will produce a decorative board with an enameled aluminum sheet which has an excellent surface and avoids the difficulties mentioned above.

Therefore, one of the objects of this invention is to provide a new enameled aluminum sheet having excellent resistance against outdoor conditions such as weather. It is another object of this invention to provide a method for producing a decorative board having a beautiful enameled surface which does not produce cracks, and is not deformed or broken after the press-shaping process.

The following is a detailed explanation of this invention.

The enameled decorative board of this invention is prepared by fixing the enameled aluminum, prepared by melt-baking the frit of low melting point on the surface of an aluminum sheet on a base material with adhesive in between the aluminum sheet and the base material, and press shaping composite. In regard to the means for forming the enameled surface on one side of the aluminum sheet, the conventional means according to which frit is melt-baked on the surface of aluminum sheet can be employed. It is preferable to use frit that has a low melting point ranging from 500° C. to 650° C.

In regard to the base material on which the enameled aluminum sheet is fixed, veneer board, fiber board, or laminated paper or cloth dipped into a solution of phenol resin, epoxy resin, melamine resin, unsaturated polyester resin, diallyl phthalate resin, or a similar thermosetting resin may be used and the dipped paper or cloth is dried to produce the base material.

As to the adhesives to be used for fixing the enameled aluminum sheet on the base material, the following can be utilized.

Phenol butyral resin, phenol epoxy resin, epoxy type resin, nitrile type rubber, neoprene type rubber and the like.

The above-named resins are used by dissolving the resins into an appropriate solvent.

For example, in the case of phenol butyral resin, methylethyl ketone is used, and in the case of the rubber type resin, ketone, an aromatic organic solvent, or a mixture thereof can be used.

The enameled aluminum sheet is placed on the base material through adhesives as mentioned above, and the laminate is press-shaped thermally into a single board. In this press-shaping process, when an ordinary suppression plate such as a stainless steel board is used, the above-mentioned unpreferable phenomenon is produced on the enameled surface after the shaping process is completed.

However, in accordance with this invention, when an enameled aluminum material is shaped between hot dies, a layer made of a relatively elastic damper material is placed between the enameled aluminum sheet and the suppression plate effectively prevents the above-mentioned difficulties from occurring on the enameled surface.

In regard to the layer of elastic damper material, thermoplastic film, paper or cloth dipped into a solution of thermosetting resin and dried thereafter, or the laminates thereof, or a sheet made of more than two kinds of materials having different expansion or shrinkage can be used.

The layer made of damper material can effectively prevent damage to the enameled surface caused by a conventional suppression board since it presents a cushion effect under a high pressure (from 70 to 120 kg./cm.$^2$) applied when the press-shaping process is carried out. At the same time, the suppression board supplies uniform pressure onto the enameled surface.

On the other hand, the damper material layer can produce the following additional effects when appropriate kinds of the materials are selected.

In other words, when the layer prepared by combining the sheet made of materials of different coefficients of expansion or shrinkage is placed between the enameled aluminum and the suppression plate, and are thermally pressed, the layer forms fine concave and convex forms because the layer is composed of two or more kinds of sheets having different coefficients of expansion and shrinkage. As a result, a concave and convex pattern is given to the enameled surface on which it is directly contacted.

In this case, the layer forming the concave and convex pattern provides the cushion effect. Therefore there is no fear that the enameled surface will be damaged, as in the case when a concave-convex pattern is provided in advance on the metal suppression board.

When the paper or cloth dipped into the thermosetting resin solution is used as the damper layer, the paper or cloth is laminated, for example, preferably from 7 to 8 sheets of such paper or cloth are laminated. The thus obtained laminate presents an excellent cushion effect against the enameled surface. At the same time, the laminate can be used as the suppression board itself and in addition to the above, in the formation of the laminate when a concave-convex pattern is produced in advance on the surface of the laminate, it is possible to provide a convex-concave pattern on the enameled surface since the pattern is copied on the enameled surface.

However, in the process for producing the product of this invention, the treatment is carried out under a high pressure ranging from 70 to 120 kg./cm.$^2$ at a temperature from 130 to 160° C. Therefore, when thermoplastic film is used as the damper layer, it is preferable to use a film whose thickness is from 20 to 100$\mu$ or more preferably from 30 to 50$\mu$, and whose melting point is above 130° C.

As examples of preferable films, the following can be given:

Polypropylene film, hard polyvinyl chloride film, polyvinylidene chloride film, polystyrene film polyester film, polycarbonate film, or nylon, and the like.

However, those films which can be more or less shrunk when they are heated are especially preferable.

As the paper and cloth dipped into the thermosetting resin solution, to be used as the damper layer, strong papers such as craft paper dipped into the solution of thermosetting resins such as phenol resin, epoxy resin, melamine resin, unsaturated polyester resin, diallyl phthalate resin, and the like, and having been dried thereafter are used.

On the other hand, it is possible to use the laminated paper or cloth having been dipped into the solution of thermosetting resins.

In particular, the laminate of 7 or 8 sheets of such paper or cloth as mentioned above plays the role of the suppression plate. Therefore, it is preferable in carrying out the process of the production of this invention.

Among the sheets made of more than two kinds of materials having different coefficient of expansion or shrinkage, polyethylene, polypropylene or such polyolefin type films, or the combinations of polystyrene film sheets, kraft paper, cloth, cellophane and polyester sheets can be included.

However, the polyolefin type film and the polystyrene film to be used in this invention are preferably monoaxially, or more preferably, biaxially drawn.

When undrawn film is used, the film itself is soft, and therefore special care should be given to the process of shaping. On the other hand, creases are brought about on the enameled surface caused by the deformation of film.

As described so far in the foregoing paragraphs, the enameled decorative boards obtained in accordance with this invention are obtained by fixing an enameled aluminum sheet on a base material. Therefore, the board thus produced has excellent resistance against water, light and corrosion, and the enameled surface can be finished beautifully without receiving damage after the press-shaping process. Thus the board can be used advantageously as a decorative board for indoor as well as outdoor use.

The following are the examples to further illustrate the present invention.

EXAMPLE 1

An enameled aluminum sheet, a biaxially-drawn polypropylene film whose thickness was, 30$\mu$ and a stainless suppression plate board whose thickness was 3 mm., were placed on the base material prepared by laminating 6 sheets of phenol resin containing paper, and the whole laminate was inserted into hot dies for press-shaping the composite. The laminate was pressed under a pressure of 100 kg./cm.$^2$ at the maximum temperature of 152° C. for 40 minutes, and was cooled with water for twenty minutes while applying pressure thereto. The shaped product was thereafter taken out of the dies, and the suppression plate and the polypropylene film were removed, and the enameled decorative board whose surface was very beautiful was obtained.

The surface of the above obtained decorative board was observed through a microscope, and no cracks or the so called "nail" phenomenon were observed.

EXAMPLE 2

An enameled aluminum sheet whose thickness was 0.15 mm. was placed in the base material made of glass mat whose thickness was 2 mm. into which unsaturated polyester resin was saturated and then dried, with phenol butyral type adhesive in between the sheet and mat. The polystyrene film and the chrome sputtered stainless steel suppression plate were placed thereon, and the composite was inserted into the hot dies of a shaping press, under the maximum pressure of 50 kg./cm.$^2$ at the maximum temperature of 120° C. for 20 minutes. Thereafter, the composite was cooled with water for 15 minutes, and removed from the dies. The suppression plate and the polystyrene film were removed, and an enameled decorative board having no surface defects was obtained.

For the sake of comparison, a decorative board was prepared in the same manner as above except for the point that the above polystyrene film was not used, and the resistance against corrosion of the obtained decorative board of this invention and that of the decorative board prepared without using polystyrene film were compared.

The product of this invention could withstand the salt water spraying test in accordance with JIS regulation for more than 300 hours, while the product prepared without using polystyrene could withstand less than 50 hours.

From this fact, in accordance with this invention, no defects were produced on the enameled surface during the press-shaping process, while in the control in which polystyrene sheet was not used, the enameled surface was damaged during the press-shaping process.

EXAMPLE 3

10 sheets of phenol resin processed paper containing 40% of resin, 7% of evaporating component (each sheet was as thick as 0.25 mm.) were overlaid. The whole laminate was subjected to the thermal press-shaping process by using a shaping press at 155° C. under the pressure of 120 kg./cm.² for 50 minutes to form a cushion board available for playing the role of the damper board as well as the suppression plate both sides of which were smooth (the thickness of the obtained board was 23 cm.).

On the other hand, 6 sheets of phenol resin processes paper were overlaid to prepare the base material, and then an enameled aluminum sheet, whose thickness was 180$\mu$ whose surface was subjected to frit baking process, was placed on the above prepared base material with phenol butyral resin adhesive between the two, and then the above prepared phenol resin laminate was placed thereon. The composite was inserted into the hot dies of the shaping press and was thermally press-shaped at the temperature of 135° C. under the pressure of 100 kg./cm.² for 40 minutes and then while providing pressure thereto, was cooled with water for 20 minutes, and then was taken out.

Thus a decorative board having an enameled surface with no damage was obtained.

On the other hand, a contamination test was carried out by using magic ink (rapidly drying ink), and the generation of cracks was not recognized.

EXAMPLE 4

In the preceding Example 3, the concave-convex pattern board was used in producing the phenol resin laminate for the suppression plate, and the phenol resin laminate having a concave-convex pattern on the surface thereof was obtained.

On the other hand, 8 sheets of phenol resin processed paper, an enameled aluminum sheet and undrawn polypropylene film (whose thickness was 30$\mu$) were laminated in the same manner as in Example 1, and the above mentioned phenol resin laminate was placed thereon with the concave-convex pattern faced downwards, i.e., the pattern on the suppression board faced the enameled surface of the aluminum sheet, and the whole was subjected to a press shaping process at a temperature of 140° C. under the pressure of 80 kg./cm.² for 50 minutes, and then while applying pressure thereto, it was cooled with water for 20 minutes, and it was taken out. Thus, a decorative board having pattern in relief with a deep fine concave-convex pattern caused by the undrawn polypropylene film and the concave-convex pattern caused by phenol resin laminate was obtained.

When the concave and convex pattern is given to the surface of the enameled decorative board, it is almost impossible to avoid cracks from the surface of the decorative board, but the decorative board obtained in the example of this invention has no cracks or the so-called "nail" phenomenon.

EXAMPLE 5

Aluminum foil whose thickness was 100$\mu$ with 80$\mu$ aluminum enamel-baking was placed on the base material of 8 sheets of kraft paper laminate having been dipped into phenol resin and dried, with phenol butyral type resin adhesive, and then the craft paper with 40$\mu$ biaxially drawn film lining was placed thereon, and the whole was inserted into the hot dies of the shaping press, and it was subjected to a thermal press shaping process at 140° C. under the pressure of 100 kg./cm.² for 50 minutes, and while giving pressure thereto, it was cooled with water for 20 minutes, and the shaped product was taken out, and then said craft paper was peeled off, an enameled decorative board having a fine concave-convex pattern on the surface was obtained.

EXAMPLE 6

Polyethylene cellophane prepared by overlaying 30$\mu$ thermal polyethylene film on 10$\mu$ cellophane was used in place of the kraft paper in the preceding Example 5. The layer was placed with the polyethylene surface turned outside, i.e. the polyethylene surface was in contact with the enameled surface of the enameled aluminum sheet, and it was inserted into the hot dies of a shaping press in the same manner as in Example 1. The thermal press-shaping was carried out at 135° C. under the pressure of 100 kg./cm.² for 50 minutes, and then while giving pressure thereto, the composite was cooled for 30 minutes with water, and then it was taken out of the dies.

Thereafter said polyethylene cellophane was removed, and the enameled decorative board having a concave-convex patterned surface thereon was obtained.

What is claimed is:

1. A method for producing an enameled decorative board from an enameled aluminum sheet without detrimentally affecting the characteristics of the enameled aluminum surface of the sheet which comprises the steps of:
    placing an enameled aluminum sheet, prepared by melt-baking a frit on a surface of the aluminum sheet, on a base material with an adhesive between the enameled aluminum sheet and the base material;
    providing a damper layer on the enameled surface of said enameled aluminum sheet;
    placing a suppression plate on said damper layer, said damper layer being relatively elastic compared to said suppression plate; and
    pressing said enameled aluminum sheet, said adhesive, said base material and said damper layer in a shaping press wherein the elasticity of said damper layer is such that the enameled surface of the enameled aluminum sheet is prevented from being substantially defromed, cracked or broken during the pressing step.

2. The method according to claim 1 wherein the base material is a material selected from a group of suitable base materials consisting of veneer, fiber board, asbestos board, or treated laminate of paper or cloth which has been prepared by dipping said laminate of paper or cloth into a thermosetting resin and being dried thereafter.

3. The method according to claim 1 wherein the damper layer is a material selected from a group of suitable damper layer materials consisting of thermoplastic film, the laminate of paper or cloth prepared by dipping said paper or cloth into a thermosetting resin solution and by drying the same, or a sheet from matter prepared by combining at least two different components having different coefficients of expansion, said components being selected from the group consisting of polyethylene, polypropylene, polyolefinic films, polystyrene film, polyester sheets, cellophane, kraft paper and cloth.

4. The method according to claim 1 wherein the damper layer and the suppression plate are replaced by a laminate of paper or cloth prepared by dipping the same into thermosetting resin solution and by drying the same.

References Cited

UNITED STATES PATENTS

| | | | |
|---|---|---|---|
| 2,524,932 | 10/1950 | Schulman | 264—316 X |
| 1,911,765 | 5/1933 | Matthews et al. | 264—316 X |
| 2,660,548 | 11/1953 | Soehner | 156—323 X |
| 2,719,796 | 10/1955 | Kappes et al. | 117—129 X |
| 2,827,393 | 3/1958 | Kadisch et al. | 117—129 X |
| 3,303,081 | 2/1967 | Michaelson et al. | 156—323 X |
| 3,480,501 | 11/1969 | Burch | 156—245 X |

CARL D. QUARFORTH, Primary Examiner

R. L. TATE, Assistant Examiner

U.S. Cl. X.R.

117—129; 264—316